UNITED STATES PATENT OFFICE.

EDOUARD THOMAS, JEAN BONAVITA, AND MAURICE OLIVIER, OF PARIS, FRANCE.

MANUFACTURE OF VISCOSE.

SPECIFICATION forming part of Letters Patent No. 646,044, dated March 27, 1900.

Application filed October 14, 1899. Serial No. 733,668. (No specimens.)

*To all whom it may concern:*

Be it known that we, EDOUARD THOMAS, chemist, JEAN BONAVITA, chemist, and MAURICE OLIVIER, merchant, of 15 Rue d'Enghien, Paris, in the Republic of France, have invented certain new and useful Improvements in the Manufacture of Viscose, of which the following is a specification.

The special product produced by this invention is a modification of a product called "viscose" and removes the objections which have hitherto prevented the application of viscose to certain purposes. The said modification covers all or nearly all the applications of viscose in which it is necessary to have a practically colorless and odorless substance.

The viscose described in Cross, Bevan, and Beadle's English Patent No. 8,700, dated May, 1892, is obtained by treating cellulose with caustic soda and then submitting the alkali cellulose thus obtained to the action of carbon bisulfid in a closed vessel for several hours. The result is a cellulose xanthate or sulfo-carbonate of sodium, soluble in water; but the presence of alkaline sulfo-carbonates in the viscose imparts to it a strong yellow color and a disagreeable odor. This color and this odor, together with the short duration of the product, have caused it to be rejected in several important uses. In the said patent sulfurous acid in aqueous solution is recommended as an agent of neutralization and decolorization; but its employment has serious drawbacks which have in a general way prevented its adoption in practice. First, its odor is very disagreeable; second, when mixed with viscose it evolves sulfureted hydrogen, which it is difficult to get rid of; third, its solution, containing only about five per cent. of real acid, largely dilutes the viscose, and, fourth, its addition always upsets the equilibrium of the solution and greatly shortens its duration. We have succeeded in removing these objections to the use of viscose—namely, its color, its odor, and its short duration—to such an extent that the difficulties which stood in the way of the adoption of viscose in certain industrial uses have completely disappeared, and we have been able, for example, to apply our new product or modified viscose with entire success to wall and decorative painting.

We obtain this result by the simultaneous addition to the alkali cellulose used for the production of viscose of a certain proportion of sodium sulfite and zinc oxid intimately mixed with the alkali cellulose. The two substances contribute concurrently to the decolorization and deodorization of the viscose. The presence of the zinc oxid tends also to prolong the life of the product, and, further, it imparts a certain degree of hardness to the white pigments which have been found suitable in the preparation of paint for wall and decorative purposes, such as barium sulfate, zinc sulfid, china-clay, whiting, &c. On the other hand, the objections referred to above to the use of sulfurous acid do not obtain in the case of sodium sulfite. First, it is without odor; second, it does not give rise to the evolution of sulfureted hydrogen; third, it is added in the solid state as a fine powder, and therefore does not dilute the solution; and, fourth, it does not appreciably affect the duration of the solution.

In practice we operate as follows: We prepare the alkali cellulose in the usual way in a vertical mill, (edge runners,) and when the action of the alkali is complete we add sodium sulfite, finely powdered, in the proportion of twenty-five to thirty per cent. of the weight of the cellulose contained in the alkali cellulose and zinc oxid in the proportion of thirty per cent., and we continue the grinding until the mixture has become thoroughly homogeneous. After this incorporation of the sodium sulfite and the zinc oxid we treat the mixture with carbon bisulfid in the ordinary way. Then we dissolve the product in water, so as to form a ten-per-cent. solution of cellulose.

We employ this product in all cases where it is advantageous to have a colorless and odorless solution of cellulose. More especially we mix it with various white and colored pigments for the production of a paint for wall decoration, calico-printing, paper-coating, &c. The paint thus produced is remarkable as containing neither oil nor size nor white lead. It produces admirable matt surfaces, which after thorough fixation of the cellulose may be washed with soap. The matt surface may be varnished or covered with a coat of ordinary paint. We also utilize our product (to which a further proportion of caustic soda and a suitable quantity of oil, preferably mineral, have been added) for the production of an oil-paint remover of extraordinary power and efficacy.

In the preparation of our product we prefer to add the sodium sulfite and the zinc oxid to the alkali cellulose; but it is obvious that they may be added to the viscose itself. Similarly we may also employ either the sodium sulfite or the zinc oxid alone.

We claim as our invention—

1. The process for the manufacture of a new industrial product consisting in incorporating suitable proportions of sodium sulfite and zinc oxid with the substance viscose, as set forth.

2. The process for the manufacture of a new industrial product consisting in adding to alkali cellulose twenty-five to thirty per cent. of sodium sulfite and about thirty per cent. of zinc oxid calculated on the cellulose contained in the alkali cellulose and then treating the mixture with carbon bisulfid as in the ordinary preparation of viscose.

Signed at Paris, France, this 14th day of September, 1899.

EDOUARD THOMAS.
JEAN BONAVITA.
MAURICE OLIVIER.

Witnesses:
EUGÈNE WATTIER,
GEORGES BORDEAU.